(12) United States Patent
Molnar

(10) Patent No.: US 6,839,951 B2
(45) Date of Patent: Jan. 11, 2005

(54) METHOD OF MAKING ANTI-SLIP GRATING

(75) Inventor: William S. Molnar, Bloomfield Hills, MI (US)

(73) Assignee: W. S. Molnar Company, Detroit, MI (US)

( * ) Notice: Subject to any disclaimer, the term of this patent is extended or adjusted under 35 U.S.C. 154(b) by 0 days.

(21) Appl. No.: 10/455,094

(22) Filed: Jun. 5, 2003

(65) Prior Publication Data
US 2004/0244200 A1 Dec. 9, 2004

(51) Int. Cl.⁷ .............................. B23P 25/00
(52) U.S. Cl. .......................... 29/459; 29/458
(58) Field of Search .................. 29/458, 459, 462, 29/464; 427/204, 448, 205, 455; 118/500

(56) References Cited

U.S. PATENT DOCUMENTS

| | | |
|---|---|---|
| 4,618,511 A | 10/1986 | Molnar |
| 4,961,973 A | 10/1990 | Molnar |
| 5,077,137 A | 12/1991 | Molnar |

Primary Examiner—John C. Hong
(74) Attorney, Agent, or Firm—Brooks Kushman P.C.

(57) ABSTRACT

A method of making grating wherein grating bars are provided with an anti-slip coating. The grating bars are placed side by side with their top edges aligned and with the sides of adjacent bars in contact with each other. The grating bars are held stationary relative to each other. Molten metal is sprayed on to the top edges to form a rough surface on the top edges. The grating bars are subsequently separated and assembled together in a spaced relationship by attaching transversely extending members to the grating bars.

15 Claims, 2 Drawing Sheets

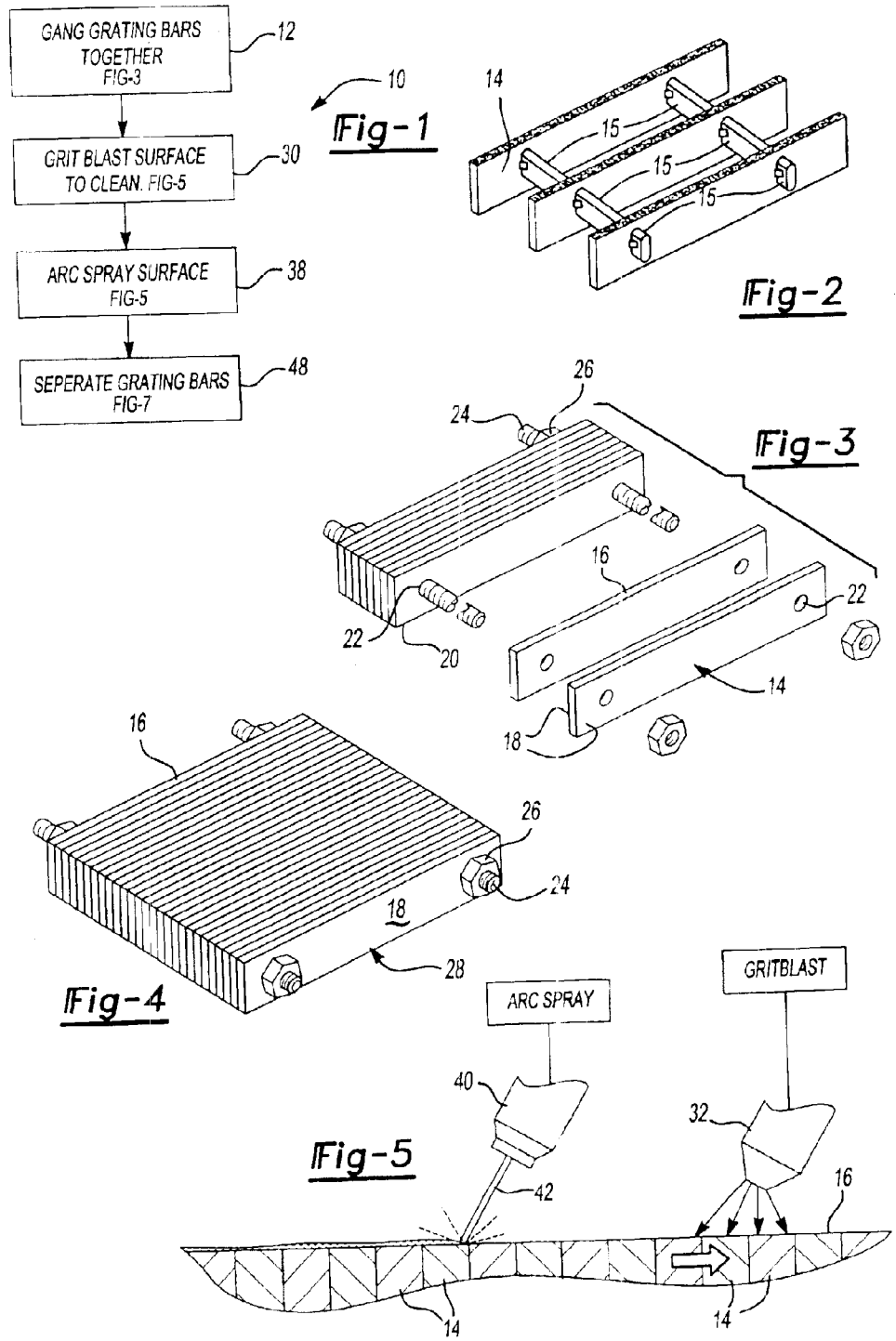

METHOD OF MAKING ANTI-SLIP GRATING

BACKGROUND OF THE INVENTION

1. Field of the Invention

The present invention relates to a method of making grating having an anti-slip coating.

2. Background Art

Grating is used as a flooring surface in many applications. Typical applications for grating include platforms and trench covers that may be used, for example, at chemical plants, waste water treatment facilities, oil derricks, and for many other applications. Anti-slip surfaces are beneficial in many applications where grating is used as a flooring surface especially if the surface is wet or coated with oil or grease. When persons work on, or vehicles drive over, grating that is used as a flooring surface, they may slip on the surface unless it has anti-slip coating applied to the top surface of the grating.

Applicant previously proposed a method for applying a non-skid coating to metal bars in U.S. Pat. No. 4,618,511. Several methods of applying a non-skid coating are disclosed in the '511 patent. The first method is to assemble a series of bearing bars together side by side with spacers between adjacent bearing bars. The spacers are made of a material that does not accept metallic spray particles and yet is capable of withstanding heat from the metal spray. The second method does not require spacers between adjacent bars but requires arrangement of the bars in a vertically stacked relationship relative to each other such that the end surfaces are offset from each other. The side surfaces of the bars may have a thin oil film to resist metal spray adherence to the side surfaces. A third approach is to provide a drive mechanism that engages alternate bars and moves the bars relative to each other during the spray coating application. The drive mechanism reciprocates the alternate bars longitudinally while the coating is being sprayed to inhibit bridging of spray coating material between adjacent bars. Alternatively, the bars could be moved in a vertical relative motion that would be perpendicular to the above-described longitudinal movement.

Applicant's prior solution proposed in the '511 patent was never widely adopted for the manufacture of non-skid grating. Instead, grating having a non-skid coating was provided by arc-spraying fully assembled sections of grating. To increase productivity, with appropriate size grating, the grating could be double stacked wherein the metal spray coating would be applied to two sections of fully assembled grating at the same time with the bearing bars being staggered to allow for application of the metal spray to the top surfaces of both of the stacked grating sections. While this method provides an excellent anti-slip grating product, a substantial amount of the metal spray is wasted. The wire used to form a high hardness anti-slip surface is a relatively expensive cored wire. If the metal spray created by the arc-spray process does not contact the top of the bearing bars, it is wasted as over spray that adheres to the sides of the bearing bars or the coating machine's work supporting surfaces.

The '511 patent focused on the concept of spreading grit over the surface and then coating the grit to bond it to the metal supporting surface. When the '511 patent was filed, it was believed that an anti-slip surface could not be applied to adjacent bars without spacers or relatively moving the bars because the weld spray tends to form a layer that bridges between adjacent bars. If spacers are used between adjacent bars, costs are incurred for the spacers and for labor required to assemble the bars and spacers together as disclosed in the '511 patent.

If the bars are assembled into a special fixture having a motor drive that is capable of moving the bars longitudinally or vertically, substantial capital costs are incurred for the fixture and labor costs are incurred for assembling the bars to the fixture. Motor drives, required to move the bars relative to each other, are required to operate in a harsh environment that may cause premature failure of the motor drive. Elaborate fixtures become coated with the anti-slip coating and may require maintenance to remove over spray deposits from the fixtures prior to reuse.

There is a need for a cost-effective method of making slip resistant grating. There is also a need to reduce wasted material lost in over spray when the anti-slip coating is applied to grating having relatively large open areas compared to the area of the bars to be coated that form the walking and working surface. There is also a need to reduce the labor required to manufacture anti-slip grating products. There is a further need for a method of making anti-slip grating that can be used to manufacture any style of grating and grating made of aluminum, steel, stainless steel or fiberglass.

The present invention is directed to solving the above problems and fulfilling the needs as outlined above. The present invention is summarized below.

SUMMARY OF THE INVENTION

According to one aspect of the present invention, a method of making grating is provided that facilitates applying an anti-slip coating to a top surface of the grating. The method comprises forming a grating bar having a top edge with a pair of oppositely facing sides. The grating bars are placed side by side with their top edges facing in one direction and with the sides of adjacent bars being in contact with each other. The grating bars are held stationary relative to each other while molten metal is sprayed onto the top sides, or edges, to form a rough surface on the top sides of the grating bars. The grating bars are then separated by breaking the bridging deposits of solidified molten metal. Grating bars are then assembled together in a spaced relationship by attaching transversely extending members to the grating bars.

According to another aspect of the invention, the grating bars may be provided with a plurality of openings and further comprise cross bars that are received in the openings and secured to the grating bars. The openings in the grating bars may be circular, square or polygonal holes and the cross bars may be cylindrical, square or polygonal cross-section rods or bars that are welded, pressure locked, or swagged to the grating bars in the assembly step.

According to another aspect of the present invention, the grating bars may be aluminum and the molten metal may also be aluminum. During the spraying step, bridging material deposits may solidify on more than one top edge. During the step of separating the grating bars, the bridging material deposits may be split by prying them apart or otherwise mechanically separating the grating bars.

According to yet another aspect of the present invention, the grating bars may be provided with a plurality of openings in which joining members are inserted to temporarily secure the grating bars together during the spraying step.

The method may also include the step of preparing the top surfaces of the bars by directing a stream of particles against the top surface before the spraying step. The stream of particles cleans and roughens the top surface of the bars. For aluminum or stainless steel grating bars, the particles used to clean and roughen the surface are preferably virgin aluminum oxide grit. For steel grating bars, the particles are preferably steel grit. Aluminum may be used to coat aluminum grating bars. A nickle chrome alloy may be used to coat stainless steel grating bars. Ferrous alloys are used to coat steel grating bars that are cleaned with steel grit. As appropriate, other combinations of substrates and coatings may be combined such as aluminum on steel, steel on aluminum, stainless steel on aluminum, and the like.

According to a further aspect of the present invention, the method may further include the step of placing the grating bars side by side and attaching a clamp to the grating bars to temporarily secure the grating bars together during the spraying step. The clamp may be a hydraulic clamp or a pneumatic clamp.

These and other aspects of the present invention will be better understood in view of the attached drawings and following detailed description of an exemplary embodiment of the invention.

BRIEF DESCRIPTION OF THE DRAWINGS

FIG. 1 is a flowchart showing one embodiment of the process for making anti-slip grating according to the present invention;

FIG. 2 is a perspective view of one type of grating that may be made according to the present invention;

FIG. 3 is an exploded perspective view of a plurality of grating bars temporarily assembled together according to the present invention;

FIG. 4 is a perspective view of a group of grating bars temporarily secured together;

FIG. 5 is a diagrammatic view showing one embodiment of a process for applying an anti-slip surface to a group of grating bars;

DETAILED DESCRIPTION OF THE PREFERRED EMBODIMENT(S)

Figure 6:
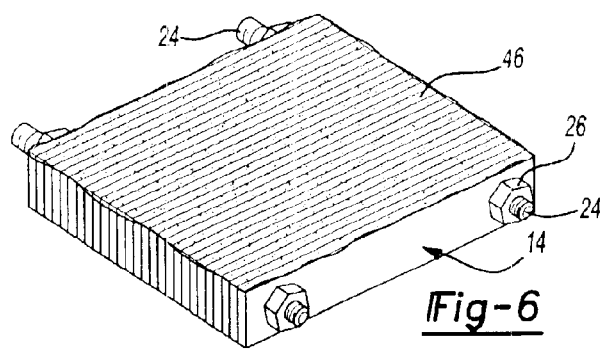
FIG. 6 is a perspective view of a group of grating bars secured together and having an anti-slip coating applied to a top surface.

Referring to FIG. 1, a process for making anti-slip grating is generally identified by reference numeral 10. The process described in FIG. 1 is also illustrated by FIGS. 3–7. The first step of the process 10 comprises ganging grating bars together as shown in FIG. 3 and as represented in the process by reference numeral 12. Grating bars 14 shown in FIG. 3 are relatively short but it should be understood that the process would most likely be applied to grating bars of substantial length, i.e., in lengths of 8, 10, 12, 16, 20 or 24 feet.

As shown in FIG. 2, the grating bars 14 are assembled together with cross bars 15 to form sections of grating.

Referring to FIG. 3, each grating bar 14 has a top side 16 and opposite lateral sides 18. A bottom side 20 faces in the opposite direction from the top side 16. Openings 22 formed in the grating bars 14 may be the same openings that are subsequently used to accept cross bars that secure the grating bars together as grating in a spaced relationship relative to each other. Rods 24 comprising threaded shafts are inserted in the openings 22. If the same openings are used as are used for insertion of cross bars, no added drilling steps are required to practice the invention. Nuts 26 may be secured to the rods 24 to provide a unitary processing assembly 28, as shown in FIG. 4, comprising a plurality of grating bars secured together by means of the rods 24 and nuts 26.

Referring to FIG. 1, the next step in the process is to grit blast the surface to clean the surface, as illustrated in FIG. 5, or the surface may be wire brushed, abrated, or scarified. In FIG. 5, a grit blast nozzle 32 is shown directing a stream of grit particles against the top surface 16 of the assembled grating bars 14. If the grating bars 14 are aluminum or stainless steel, the grit is preferably virgin aluminum oxide grit. If the grating bars 14 are steel, the grit is preferably steel grit.

Referring now to FIGS. 1 and 5, after the grit blast step 30, a rough surface is provided for further processing including an application of arc-sprayed molten metal, at 38. The arc-spray illustrated in FIG. 5 is provided by a weld gun 40 that directs an arc-spray 42 on the top surface 16 of the grating bars 14. The arc-spray provides an anti-slip coating that is applied over the roughened surface to provide an anti-slip surface.

Referring now to FIG. 6, a coated assembly of bars 14 is shown that comprise a processing assembly 28 to which an anti-slip coating 46 has been applied.

Figure 7:
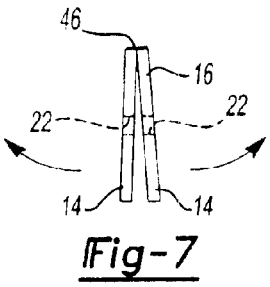
FIG. 7 is a diagrammatic view showing adjacent grating bars having an anti-slip coating layer on one side being separated.

Referring to FIGS. 1 and 7, the next step in the process is to separate the grating bars 14. The rods 24 are removed from the holes 22 to allow the grating bars 14 to be separated by separating the bars or prying the bars apart. The thickness of the anti-slip coating 46 must be controlled to allow for easy separation of the grating bars 14. If the anti-slip coating 46 is formed of aluminum or another relatively low tensile strength material, the thickness of the anti-slip coating may be thicker than if the coating material is of higher tensile strength such as a steel or other ferrous alloy. For example, a coating of aluminum may be applied that is 0.015 to 0.032 in thickness. The thickness of a steel or stainless steel anti-slip coating may range from 0.010 to 0.022. If the thickness of the coating 46 is excessive, the bars may become difficult or impossible to separate.

Figure 8:
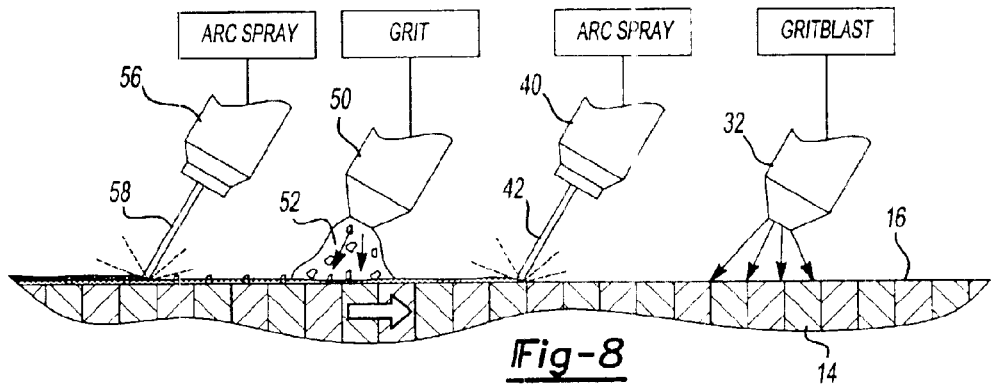
FIG. 8 is a diagrammatic view of an alternative embodiment of the present invention wherein an anti-slip surface including grit encapsulated between two layers of arc-spray coating is illustrated.

Referring now to FIG. 8, another alternative processing method is shown. In the process illustrated by FIG. 8, a grit blast nozzle 32 cleans and roughens the top surface 16 of the grating bars 14. A weld gun 40 then applies an arc-spray 42 to the surface. The first arc-spray layer is then coated with grit that may be applied by a grit applicator 50 that deposits a layer of grit 52. A second weld gun 56 directs the second arc-spray 58 onto the top surface 16 to cover the grit 52.

Figure 9:
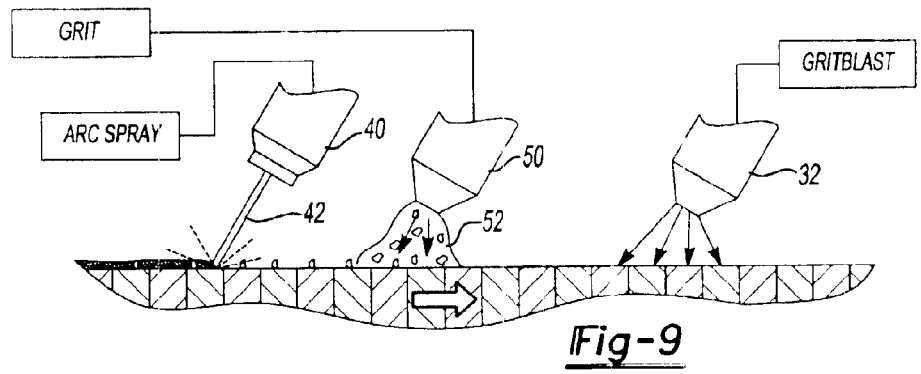
FIG. 9 is a diagrammatic view showing another alternative embodiment of the present invention wherein grit is covered with a single layer of arc-spray is illustrated.

Referring to FIG. 9, another embodiment of the invention is shown wherein the surface is first cleaned and roughened by nozzle 32. A layer of grit 52 is then deposited on the roughened surface by means of a grit applicator 50. A weld gun 40 is then used to deposit an arc-spray onto the surface to encapsulate the grid 52.

Figure 10:
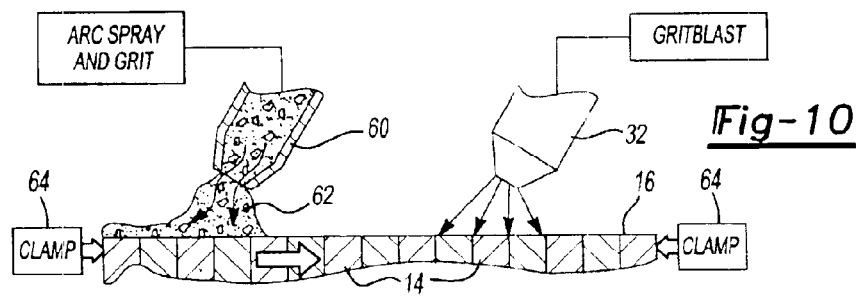
FIG. 10 is a diagrammatic view showing an additional alternative embodiment of the invention wherein a cored arc-spray wire including grit particles is used to apply an anti-slip coating to a group of bearing bars.

Referring to FIG. 10, yet another embodiment of the present invention is shown in which a grit blast nozzle 32 is used to roughen and clean the top surface 16 of the grating bars 14. An arc-spray using a cored wire 60 including grit particles applies a grit and arc-spray 62 coating onto the top surface 16 in one step.

If the alternative embodiments disclosed in FIGS. 8–10 are used, the coated assembly of bars 44 is separated after removing the rods 24 as previously described with reference to FIG. 6. After the bars are separated, they are assembled by processes and procedures for assembling grating bars 14 into grating by inserting cross members or cross bars 15 that hold the grating bars 14 together in a spaced relationship. The cross bars 15 may be welded, swagged, or pressed together to hold the cross bars in place.

Referring to FIG. 10, an alternative embodiment is shown in which a clamp 64 is used to hold the grating bars 14 together instead of the rods 24 and nuts 26. The clamps 64 may be mechanical, hydraulic, or pneumatic clamps.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of making grating, comprising:
    making a plurality of grating bars having a top edge, a bottom edge and a pair of oppositely facing sides;
    placing the grating bars side-by-side with their top edges aligned and with the sides of adjacent bars in contact with each other, the grating bars being held stationary;
    spraying molten metal onto the top edges to form a rough surface on the top edges;
    separating the grating bars;
    assembling the grating bars together in a spaced relationship by attaching transversely extending members to the grating bars.

2. The method of claim 1 wherein the grating bars are provided with a plurality of openings and further comprising crossbars that are received in the openings and secured to the grating bars.

3. The method of claim 2 wherein the openings are holes and the crossbars are cylindrical, square, or polygonal cross sectional rods that are welded, or mechanically locked to the grating bars.

4. The method of claim 1 wherein the grating bars are aluminum and the molten metal is aluminum.

5. The method of claim 4 wherein the spraying step causes bridging material deposits to solidify on more than one top edge and during the step of separating the grating bars the bridging material deposits are split by mechanically separating the grating bars.

6. The method of claim 1 wherein the grating bars are provided with a plurality of openings and wherein the step of placing the grating bars side by-by-side further comprises inserting fasteners into the openings to temporarily secure to the grating bars together during the spraying step.

7. The method of claim 1 further comprising the step of preparing the top surfaces of the bars by directing a stream of particles against the top surfaces before the spraying step.

8. The method of claim 7 wherein the grating bars are aluminum and the molten metal is aluminum and the particles are aluminum oxide grit.

9. The method of claim 7 wherein the grating bars are stainless steel and the molten metal is a nickle chrome alloy and the particles are aluminum oxide grit.

10. The method of claim 7 wherein the grating bars are steel and the molten metal is a ferrous alloy and the particles are steel grit.

11. The method of claim 1 wherein the grating bars are provided with a plurality of openings and, following the step of placing the grating bars side by side, the method further comprises attaching a clamp to the plurality of grating bars to temporarily secure to the grating bars together during the spraying step.

12. The method of claim 11 wherein the clamp is a hydraulically actuated clamp.

13. The method of claim 11 wherein the clamp is a pneumatically actuated clamp.

14. The method of claim 1 wherein the step of separating the grating bars is performed by prying the bars apart.

15. The method of claim 1 further comprising the step of sprinkling grit on the top edges and coating the grit during the spraying step.

* * * * *